(12) United States Patent (10) Patent No.: US 12,059,613 B2
Rao (45) Date of Patent: Aug. 13, 2024

(54) GAME OBJECT CONTROL METHOD

(71) Applicant: NETEASE (HANGZHOU) NETWORK CO., LTD., Zhejiang (CN)

(72) Inventor: Feng Rao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 207 days.

(21) Appl. No.: 17/606,064

(22) PCT Filed: Mar. 24, 2020

(86) PCT No.: PCT/CN2020/080938
§ 371 (c)(1),
(2) Date: Oct. 25, 2021

(87) PCT Pub. No.: WO2020/215959
PCT Pub. Date: Oct. 29, 2020

(65) Prior Publication Data
US 2022/0193544 A1 Jun. 23, 2022

(30) Foreign Application Priority Data

Apr. 26, 2019 (CN) .......................... 201910346164.2

(51) Int. Cl.
A63F 13/42 (2014.01)
A63F 13/2145 (2014.01)
A63F 13/55 (2014.01)

(52) U.S. Cl.
CPC .......... A63F 13/42 (2014.09); A63F 13/2145 (2014.09); A63F 13/55 (2014.09)

(58) Field of Classification Search
CPC ...... A63F 13/42; A63F 13/2145; A63F 13/55; A63F 13/533; A63F 13/5372
See application file for complete search history.

(56) References Cited

U.S. PATENT DOCUMENTS

2001/0026265 A1* 10/2001 Kikuchi .................. A63F 13/45
345/157
2007/0032282 A1* 2/2007 Hamamoto ............. A63F 13/58
463/9

(Continued)

FOREIGN PATENT DOCUMENTS

CN 101495205 A 7/2009
CN 104484101 A 4/2015

(Continued)

OTHER PUBLICATIONS

Liquidpedia, "Hotkeys," Jan. 2, 2018, https://web.archive.org/web/20180102035415/https://liquipedia.net/starcraft2/Hotkeys (Year: 2018).*

(Continued)

Primary Examiner — Kevin Y Kim
(74) Attorney, Agent, or Firm — Qinghong Xu

(57) ABSTRACT

A game object control method is provided in embodiments of the present disclosure. The method includes: at least one target game object is determined in at least one game object, in response to object selecting operation. A grouping control is provided in response to object grouping trigger operation. The grouping control includes at least one grouping sub-control. A target grouping sub-control is determined in the at least one grouping sub-control, in response to a group selecting operation, and the at least one target game object is determined as a target group corresponding to the target grouping sub-control. In the present embodiment, by means of a grouping control and a group selecting operation, a group of a target game object can be determined as a target group corresponding to a target grouping sub-control, thereby quick grouping of the at least one game object to improve the operation efficiency of games is realized.

21 Claims, 6 Drawing Sheets

(56) References Cited

U.S. PATENT DOCUMENTS

| | | | |
|---|---|---|---|
| 2007/0105626 A1* | 5/2007 | Cho | ........................ A63F 13/56 463/37 |
| 2017/0168855 A1 | 6/2017 | St. Clair | |
| 2018/0081484 A1 | 3/2018 | Black | |
| 2018/0335906 A1 | 11/2018 | He | |

FOREIGN PATENT DOCUMENTS

| | | | |
|---|---|---|---|
| CN | 105808564 | A | 7/2016 |
| CN | 106730810 | A | 5/2017 |
| CN | 106823376 | A | 6/2017 |
| CN | 107362535 | A | 11/2017 |
| CN | 107376339 | A | 11/2017 |
| CN | 107422934 | A | 12/2017 |
| CN | 107589883 | A | 1/2018 |
| CN | 107864297 | A | 3/2018 |
| CN | 108319671 | A | 7/2018 |
| CN | 109126133 | A | 1/2019 |
| CN | 109240573 | A | 1/2019 |
| CN | 109522278 | A | 3/2019 |
| CN | 109568939 | A | 4/2019 |
| CN | 110251937 | A | 9/2019 |
| JP | 5890926 | B1 | 3/2016 |
| JP | 6360931 | B1 | 7/2018 |
| JP | 2019-013465 | A | 1/2019 |
| WO | 2007136972 | A2 | 11/2007 |
| WO | 2008013119 | A1 | 1/2008 |

OTHER PUBLICATIONS

How to operate ARK モバイルの, God ゲ—Raiders [online], Mar. 8, 2019, https://kamigame.jp/ARK/%E6%94%BB%E7%95%A5%E3%82%AC%E3%82%A4%E3%83%89/%E6%93%8D%E4%BD%9C%E6%96%B9%E6%B3%95.html, [Searched on Nov. 8, 2022].

[Touken Ranbu] Differences and advantages between the PC browser version and the smartphone app version Thorough Comparison of Toto [Tourabu], Capture Encyclopedia [online], Jan. 2018 Feb. 19, https://gamepedia.jp/tourabu/archives/3171,[Searched on Nov. 8, 2022].

Corresponding JP OA2 issued on May 9, 2023.

«How to operate ARK mobile, God game strategy» [online]; Mar. 8, 2019; https://kamigame.jp/ARK/%E6%94%BB%E7%95%A5%E3%82%AC%E3%82%A4%E3%83%89/%E6%93%8D%E4%BD%9C%E6%96%B9%E6%B3%95.html.

<[Touken Ranbu] A thorough comparison of the differences and advantages of the PC browser version and the smartphone app version [Tourabu]>, Capture Encyclopedia [online],Dec. 19, 2018; https://gamepedia.jp/tourabu/archives/3171.

Corresponding JP first search results issued one Nov. 8, 2022.

1st Office Action dated Oct. 18, 2023 of Chinese Application No. 2020108797188.

Notice of Allowance dated May 22, 2024 for Chinese Application No. 202010879718.8.

* cited by examiner

GAME OBJECT CONTROL METHOD

CROSS-REFERENCE TO RELATED APPLICATIONS

The present application claims priority to Chinese Patent Priority No. 201910346164.2, filed on Apr. 26, 2019, and named after "Game Object Control Method and Apparatus", Contents of the present disclosure are incorporated by reference in entirety of the Chinese Patent Application.

TECHNICAL FIELD

The embodiments of the present disclosure relate to the technical field of games, and in particular to a game object control method.

BACKGROUND

With a development of a mobile communication technology, more and more mobile terminal games have emerged. Due to limitations of hardware conditions and interaction modes, most of control modes in traditional Personal Computer (PC)-side games cannot be transplanted to the mobile terminal games, so that the mobile terminal games and the traditional PC-side games are greatly different in the control modes.

In some mobile terminal games, there is often a need to select and control at least one game object. Due to a limitation of a touch input mode of a mobile terminal, a selection of at least one existing game object and a control solution of subsequent game object may have problems with inconvenient operation and low efficiency.

SUMMARY

According to an embodiment of the present disclosure, a game object control method is provided. The method may be applied to a mobile touch terminal rendered with a graphical user interface. The graphical user interface includes at least one game object. The method includes:
  in response to object selecting operation, at least one target game object is determined in the at least one game objects;
  in response to object grouping trigger operation, a grouping control is provided, wherein the grouping control included at least one grouping sub-control; and
  in response to a group selecting operation, a target grouping sub-control is determined in the at least one grouping sub-control, and the at least one target game object is determined as a target group corresponding to the target grouping sub-control.

According to another an embodiment of the present disclosure, a game object control apparatus is provided. The apparatus may be applied to a mobile touch terminal rendered with a graphical user interface. The graphical user interface includes at least one game object. The apparatus includes at least one processor, and at least one memory for storing a program element. The program element is executed by the processor, and the program element includes:
  a selection component, configured to determine at least one target game object in the at least one game object, in response to object selecting operation;
  a trigger component, configured to provide a grouping control, in response to object grouping trigger operation, wherein the grouping control includes at least one grouping sub-control; and
  a group component, configured to determine a target grouping sub-control in the at least one grouping sub-control, in response to a group selecting operation, and determine the at least one target game object as a target group corresponding to the target grouping sub-control.

According to another embodiment of the present disclosure, a game object control device is provided, which includes:
  a memory, configured to store at least one executable instruction; and
  a processor, connected with the memory, and configured to execute the at least one executable instruction stored in the memory, wherein the at least one executable instruction included:
  in response to object selecting operation, at least one target game object is determined in the at least one game objects;
  in response to object grouping trigger operation, a grouping control is provided, wherein the grouping control included at least one grouping sub-control; and
  in response to a group selecting operation, a target grouping sub-control is determined in the at least one grouping sub-control, and the at least one target game object is determined as a target group corresponding to the target grouping sub-control.

According to another embodiment of the present disclosure, a non-transitory storage medium is provided. The non-transitory stores a computer program, on which at least one computer program is stored, the at least one computer program being executed by a processor to implement the following steps:
  in response to object selecting operation, at least one target game object is determined in the at least one game objects;
  in response to object grouping trigger operation, a grouping control is provided, wherein the grouping control included at least one grouping sub-control; and
  in response to a group selecting operation, a target grouping sub-control is determined in the at least one grouping sub-control, and the at least one target game object is determined as a target group corresponding to the target grouping sub-control.

DETAILED DESCRIPTION OF THE EMBODIMENTS

In order to make the objectives, technical solutions, and advantages of the embodiments of the present disclosure clearer, the technical solutions in the embodiments of the present disclosure will be clearly and completely described below with reference to the drawings in the embodiments of the present disclosure. It is apparent that described embodiments are a part of the embodiments of the present disclosure, not all of the embodiments. On the basis of the embodiments of the present disclosure, all other embodiments obtained on the premise of no creative work of those of ordinary skill in the art should fall within scope of protection of the embodiments of the present disclosure.

Figure 1:
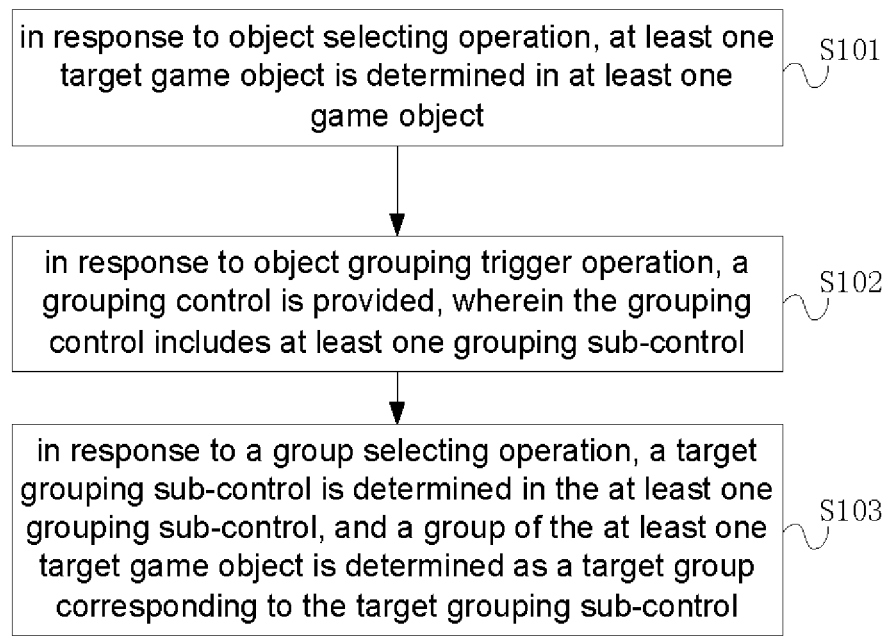
FIG. 1 is a flowchart 1 of a game object control method according to one of the embodiments of the present disclosure.

FIG. 1 is a flowchart 1 of a game object control method according to one of the embodiments of the present disclosure. As shown in FIG. 1, the method may include the following steps.

At S101, in response to object selecting operation, at least one target game object is determined in at least one game object.

Specifically, the present embodiment is applied to a mobile touch terminal rendered with a graphical user interface. The mobile touch terminal refers to a mobile terminal device with a touch-enabled element (such as a touch screen). Optionally, the mobile terminal device may be a mobile phone (or "cellular" phone), a computer with a wireless communication function, etc. Or, the mobile terminal device may also be portable, pocket-sized, handheld computer-inbuilt mobile apparatus or device, which will not be specially limited herein.

Furthermore, the graphical user interface refers to a computer operation for user interface displayed in a graphical manner, which allows a user to use an input device to manipulate icons or menu controls on a screen of the mobile touch terminal, wherein the input device may be, for example, a touch sensitive pen, or may also be an infrared device. Any input device that may perform touch operations is within the scope of protection of the present embodiment, and the present embodiment does not limit this. During the game, a user interacts with a client or a server by operating on the graphical user interface.

In the present embodiment, the graphical user interface includes at least one game object. In response to the object selecting operation, the at least one target game object is determined in the at least one game object on the graphical user interface.

In an optional implementation method, the object selecting operation may be a touch sliding operation. For example, a closed sliding trajectory (such as a circular trajectory, a rectangular trajectory or other regularly shaped trajectories, or other irregular closed trajectories) may be drawn through a method of touch on the graphical user interface, and the at least one game object in a closed area corresponding to the closed sliding trajectory is determined as the at least one target game object. In this way, a game player can conveniently, quickly and intuitively select the at least one target game object on the graphical user interface by the touch sliding operation through the closed sliding trajectory.

Or, a closed area may be determined by a non-closed sliding trajectory (for example, a diagonal of a rectangle is determined according to the start and end points of the sliding trajectory, and a rectangle is determined according to a preset aspect ratio, or a diameter is determined according to the start and end points of the sliding trajectory, and a circle is determined according to the diameter), and the at least one game object within the closed area is determined as the at least one target game object, so that the at least one target game object can be selected conveniently and quickly.

In another optional implementation method, the object selecting operation may also be a touch tapping operation, for example, the touch tapping operation may be performed on the graphical user interface in a touch mode, and then the at least one game object within a preset range of the touch tapping operation is determined as the at least target game object.

The at least one game object within the preset range may be, for example, at least one game object corresponding to a click position of the touch tapping operation. Specifically, the click position may be, for example, an actual position of the at least one game object on the graphical user interface, or a mapping position of the at least one game object on the graphical user interface (such as a mapping relationship between a mini map and a full map).

Or, the at least one game object within the preset range may also be at least one game object within a preset range centered on the click position of the touch tapping operation. The preset range may be a circular range with a preset radius or a rectangle range with a preset area or any irregular range, etc. Further optional, the preset range may not be centered on the click position, but a range that shows a mapping relationship with the click position (such as a touch tapping operation is performed on a certain preset control, thereby the at least one game object within the preset range corresponding to the preset control is determined as the at least one target game object).

Those skilled in the art can understand that specific object selecting operation may be set according to actual needs, and its implementation manner is not limited to the examples introduced above, as long as the object selecting operation can be implemented to determine the at least one target game object in the at least one game object. There are no special restrictions herein.

At S102, in response to object grouping trigger operation, a grouping control is provided, wherein the grouping control includes at least one grouping sub-control.

Furthermore, in the present embodiment, the selected at least one target game object is grouped according to the grouping control, and therefore first in response to the object grouping trigger operation to provide the grouping control. In the present embodiment, the grouping control includes the at least one grouping sub-control. The at least one grouping sub-control is used for indicating a specific group. The grouping control may be, for example, set as a virtual wheel control. The corresponding at least on grouping sub-control is a fan-shaped sub-area of the virtual wheel control.

Or, the grouping control may also be, for example, set as a rectangular control including N*M element rectangles, wherein N and M are positive integers, and the corresponding at least on grouping sub-control is a element rectangle in the rectangular control. A specific implementation manner of the grouping control in the present embodiment is not limited, and the specific implementation manner may be selected according to actual needs.

In a possible implementation method, in response to the object selecting operation that is a touch sliding operation, the object grouping trigger operation may be an area closing operation of the sliding trajectory of the touch sliding operation. The area closing operation is an operation that makes the sliding trajectory constitute a closed area. Specifically, after the sliding trajectory of the touch sliding operation forms the closed area, the at least one game object within the closed area is determined as the at least one target game object, and in response to the area closing operation, a grouping control is provided on the graphical user interface.

In another optional implementation method, in response to the object selecting operation that is a touch tapping operation, the object grouping trigger operation is a touch tapping operation that meets a preset condition among multiple touch tapping operations. Specifically, in the present embodiment, the object selecting operation may include multiple touch tapping operations, so that the ant least one target game objects may be determined. Furthermore, for example, a touch tapping operation during which a touch click duration is greater than a preset duration may be determined as the object grouping trigger operation. Or a touch tapping operation under which a touch click pressure is greater than a preset pressure may be determined as the object grouping trigger operation.

Specifically, in the actual implementation process, the at least one target game object is selected by the touch tapping operation, and in response to the touch duration of the touch tapping operation that is greater than the preset duration, or the pressure of the touch point is greater than the preset pressure, in response to the object grouping trigger operation, the grouping control is provided on the graphical user interface.

Secondly, in an optional embodiment, the object grouping trigger operation may not correspond to the object selecting operation, but may be set as a separate operation, for example, it may be set as a separate long-press operation, or a preset shape operation by a trigger sliding, etc. In the present embodiment, specific implementation manner of the object grouping trigger operation is not limited, and specific design can be selected according to actual needs, as long as the grouping control can be provided.

At S103, in response to a group selecting operation, a target grouping sub-control is determined in the at least one grouping sub-control, and the at least one target game object is determined as a target group corresponding to the target grouping sub-control.

In the present embodiment, the target group of the at least one target game object is determined according to the grouping control. Specifically, each grouping sub-control in the grouping control corresponds to its respective group, and in response to the group selecting operation, the target grouping sub-control is determined in the grouping sub-control. For example, a group of the target grouping sub-control corresponding to the group selecting operation is group 1, and then the at least one target game object is determined as group 1.

The group selecting operation may be, for example, a touch sliding operation. For example, after the grouping control is provided, a touch sliding operation is performed on the grouping control, and after the target grouping sub-control is determined to be selected, the touch sliding operation is ended. At this time, the grouping sub-control corresponding to an end touch point of the touch sliding operation is the target grouping sub-control.

Or, the group selecting operation may also be, for example, a touch tapping operation, such as a single click operation or a long press operation on the grouping sub-control to be selected in the grouping control, thereby the grouping sub-control is determined as the target grouping sub-control.

Those skilled in the art can understand that specific implementation manner of the group selecting operation may be set according to actual needs, as long as the target grouping sub-control can be determined in the grouping sub-control, and the present embodiment does not limit this herein.

In the embodiment of the present disclosure, the game object control method includes: in response to object selecting operation, at least one target game object is determined in at least one game object. In response to object grouping trigger operation, a grouping control is provided, wherein the grouping control includes at least one grouping sub-control. In response to a group selecting operation, a target grouping sub-control is determined in the at least one grouping sub-control, and the at least one target game object is determined as a target group corresponding to the target grouping sub-control. That is to say, in the present disclosure, a grouping control including at least one grouping sub-control is provided by object grouping trigger operation, and in response to a group selecting operation, a target grouping sub-control is determined in the at least one grouping sub-control. The at least one target game object is determined as a target group corresponding to the target grouping sub-control, thereby quick grouping of game objects is realized. Game objects can be quickly divided into multiple groups according to game conditions and battle strategies, and it is also convenient to quickly select at least one game object in corresponding group for control operations during subsequent games (for example, the at least one game object in the corresponding group are controlled to attack a certain enemy target, etc.), thereby improving the efficiency of selection and control of the at least one game object in the game.

On the basis of the above embodiment, specific implementation method of determining the group of the at least one target game object as the target group corresponding to the target grouping sub-control may be, for example, the at least one target game object is incorporated into the target group, or combined into the target group. Or, it is also possible to replace at least one existing game object in the target group with the at least one target game object. The specific implementation method of adding, combining or replacing will be described in detail below in conjunction with specific embodiments.

Figure 2:
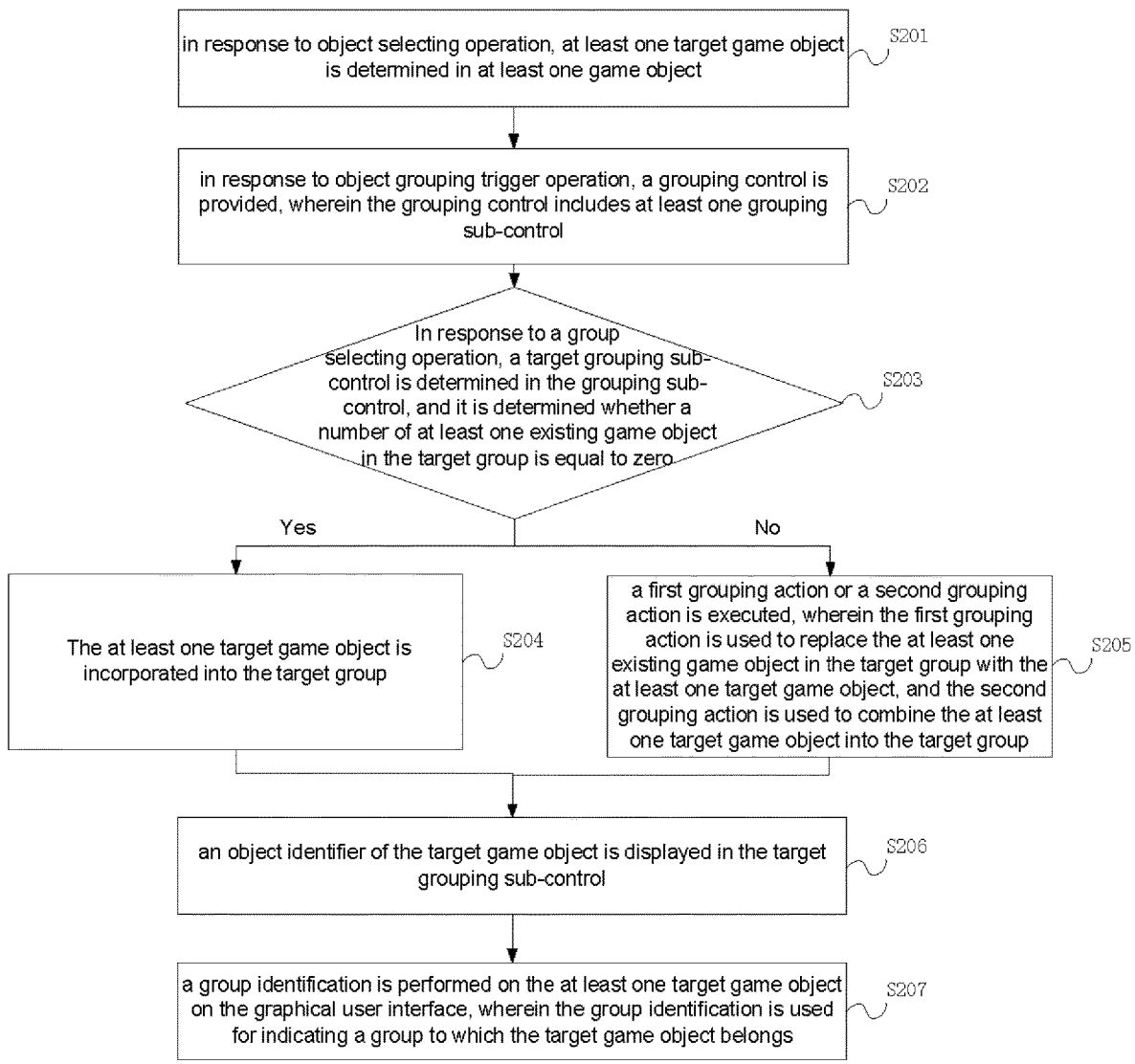
FIG. 2 is a flowchart 2 of a game object control method according to one of the embodiments of the present disclosure.
Figure 3:
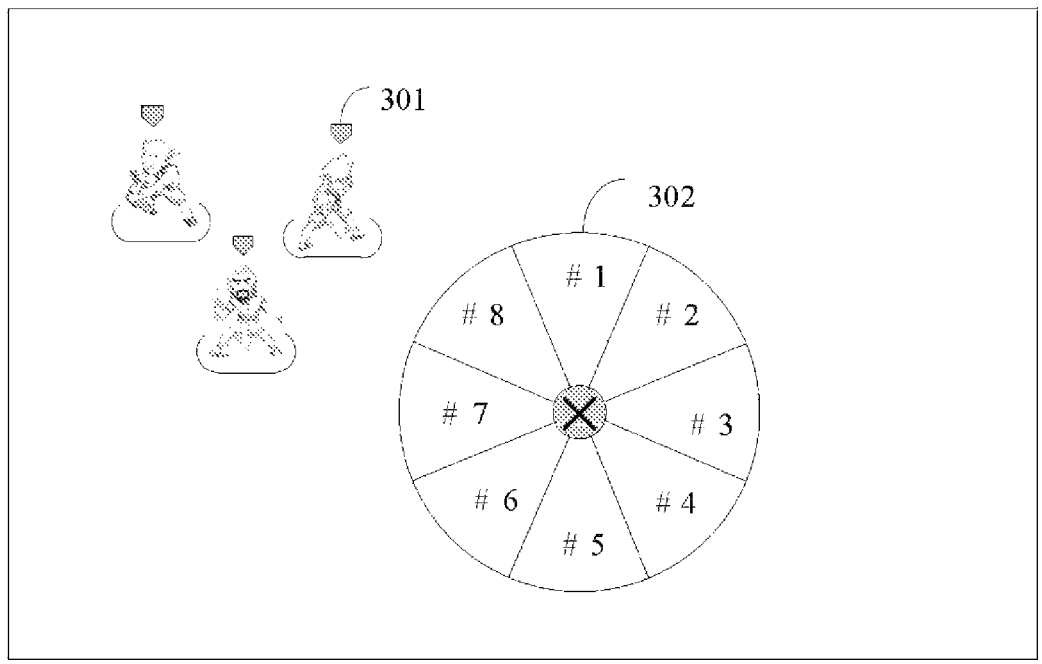
FIG. 3 is a schematic interface diagram 1 of a game object control method according to one of the embodiments of the present disclosure.
Figure 4:
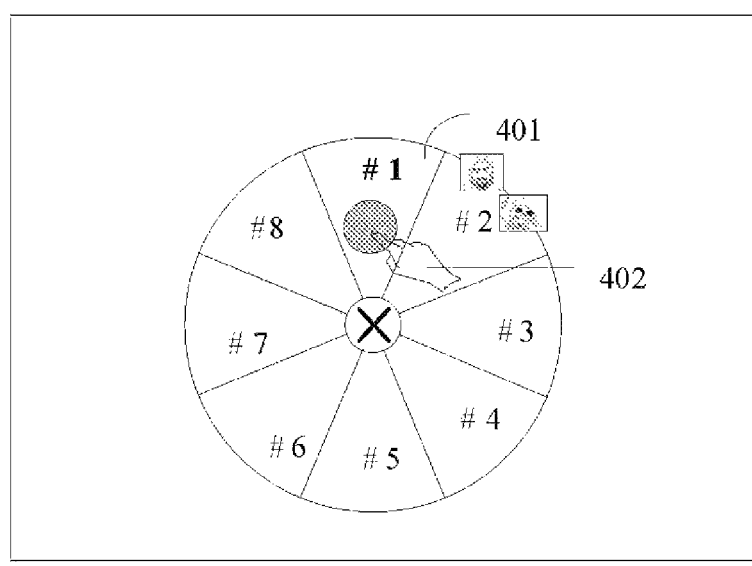
FIG. 4 is a schematic interface diagram 2 of a game object control method according to one of the embodiments of the present disclosure.
Figure 5:
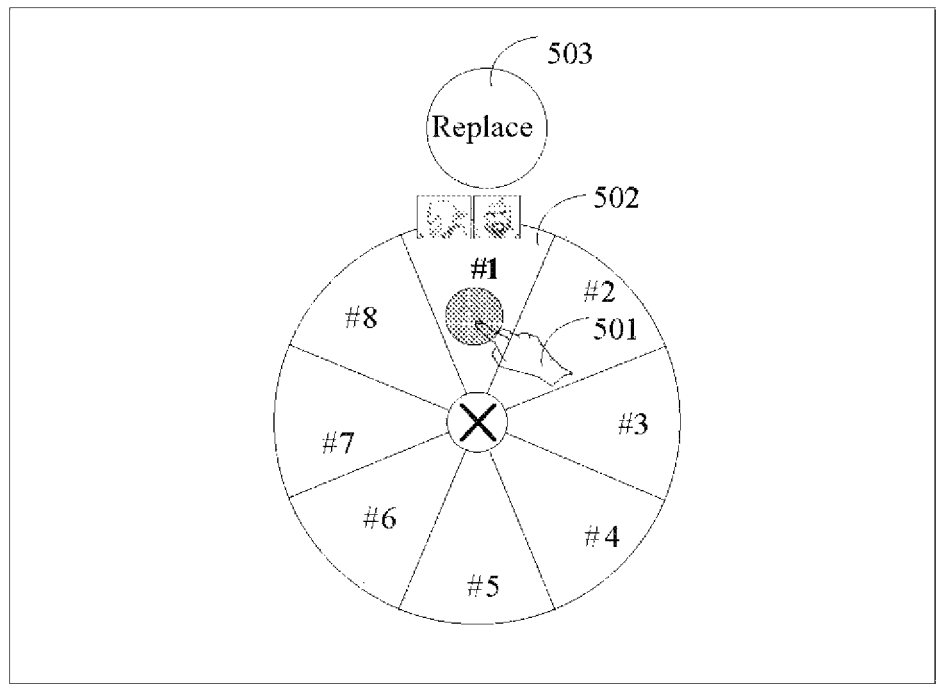
FIG. 5 is a schematic interface diagram 3 of a game object control method according to one of the embodiments of the present disclosure.
Figure 6:
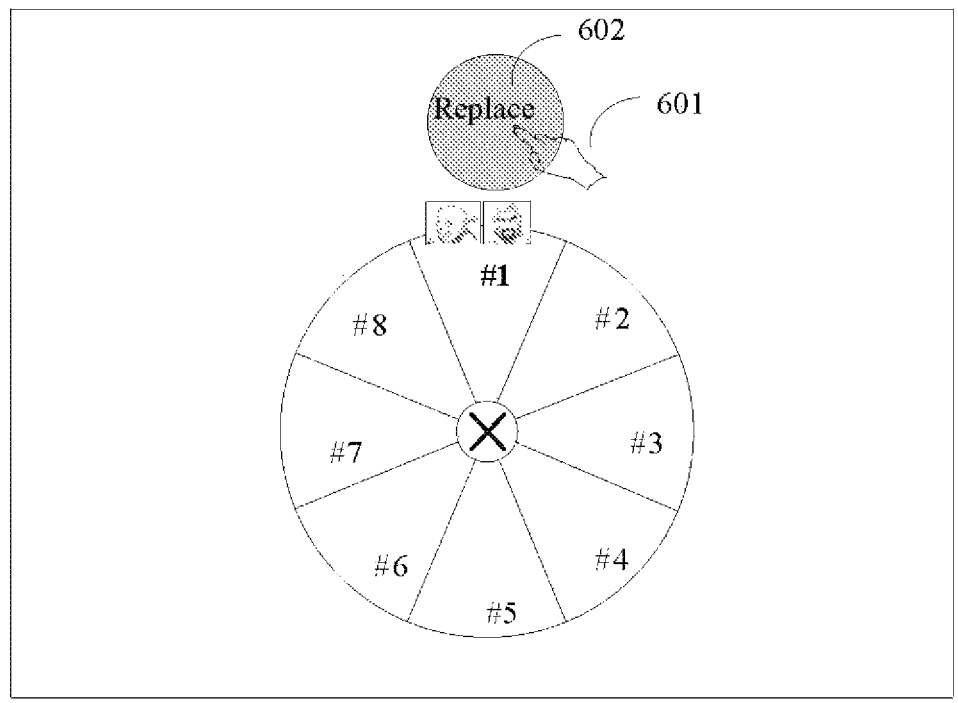
FIG. 6 is a schematic interface diagram 4 of a game object control method according to one of the embodiments of the present disclosure.

The game object control method provided by the embodiment of the present disclosure will be described below with reference to FIG. 2 to FIG. 6. FIG. 2 is a flowchart 2 of a game object control method according to one of the embodiments of the present disclosure. FIG. 3 is a schematic interface diagram 1 of a game object control method according to one of the embodiments of the present disclosure. FIG. 4 is a schematic interface diagram 2 of a game object control method according to one of the embodiments of the present disclosure. FIG. 5 is a schematic interface diagram 3 of a game object control method according to one of the embodiments of the present disclosure. FIG. 6 is a schematic interface diagram 4 of a game object control method according to one of the embodiments of the present disclosure.

At S201, in response to object selecting operation, at least one target game object is determined in at least one game object.

At S202, in response to object grouping trigger operation, a grouping control is provided, wherein the grouping control includes at least one grouping sub-control.

Specifically, the implementation method of S201 and 202 is similar to that of S101 and S102, and will not be repeated herein.

Optionally, the object grouping trigger operation is an area closing operation of a sliding trajectory. For example, the object selecting operation is a sliding operation, and a trajectory of the sliding operation is used for forming a closed area to select the at least one target game object. The object grouping trigger operation is an area closing operation of the sliding trajectory. That is to say, in response to the area that is closed, provision of the grouping control is triggered. In this way, on the basis of the target game object is quickly selected, efficiency of group operation can be further improved.

Optionally, the object selecting operation includes multiple touch tapping operations, and the object grouping trigger operation is a touch tapping operation that meets a preset condition among the multiple touch tapping operations. For example, through a touch tapping operation that acts on a game object, the game object is selected, and multiple game objects are clicked in turn to select the multiple game objects. During the sequential clicking process, in response to a certain click operation that is detected to be met a preset condition, the selection of a target game object is completed and provision of a grouping control is triggered. For example, the operation is a touch tapping operation during which a touch click duration is greater than a preset duration, or a touch tapping operation under which a touch click pressure is greater than a preset pressure. In this way, on the basis of the target game object is quickly selected, the efficiency of group operation can be further improved.

In an optional embodiment, the following describes in detail in conjunction with FIG. 3 in which the grouping control is a virtual wheel control and the grouping sub-control is a fan-shaped sub-control of the virtual wheel control. As shown in FIG. 3, in response to object selecting operation, at least one target game object 301 is determined. For example, the target game object 301 may be displayed in a preset manner, such as highlighting or a preset identification indicator, so as to indicate that a current game object is selected as the target game object, so that a user can quickly obtain the state of the game object.

Secondly, in response to object grouping trigger operation, a grouping control 302 is provided, wherein the grouping control 302 includes at least one grouping sub-control. Each grouping sub-control corresponds to a respective group. For example, numbers 1 to 8 are used for indicating each group. Specific group number and group representation may be set according to actual needs, which is not limited herein. FIG. 3 is only a possible implementation method. For example, in response to the grouping control 302 that is rectangular or other possible display modes, at least one implementation manner is similar, and will not be repeated herein.

At S203, in response to a group selecting operation, a target grouping sub-control is determined in the grouping sub-control, and it is determined whether a number of at least one existing game object in the target group is equal to zero.

In response to the number of the at least one existing game object in the target group that is equal to zero, S204 is performed, and in response to the number of the at least one existing game object in the target group that is not equal to zero, S205 is performed.

Specifically, specific implementation method of determining the target grouping sub-control in the grouping sub-control in response to the group selecting operation has been described in detail in the above embodiment, and will not be repeated herein.

Furthermore, the target group corresponding to the target grouping sub-control may include at least one game object that has been grouped into the target group. In the present embodiment, operation performed in response to the target group that does not include the at least one game object is different from operation performed in response to the target group that includes the ate least one game object. Therefore, after the target grouping sub-control is determined, it is necessary to first determine whether the number of the at least one existing game object in the target group corresponding to the target grouping sub-control is zero.

Specific determination manner may be, for example, firstly acquiring a group identifier of the target group, and secondly determining whether a current target group includes the at least one game object according to the group identifier of the target group, or firstly acquiring group identifiers corresponding to all game objects currently grouped, and secondly determining whether the acquired group identifier includes the group identifier of the target group, etc. Specific implementation manner of determination is not limited herein.

At S204, the at least one target game object is incorporated into the target group.

Optionally, in response to the number of the at least one existing game object in the target group that is equal to zero, it indicates that the current target group does not include the at least one game objects, and the at least one target game object is directly incorporated into the target group.

The following describes in conjunction with FIG. 4, as shown in FIG. 4, a target grouping sub-control 401 does not display an avatar identifier of a game object, which indicates that a game group corresponding to a target grouping sub-control 402 does not include at least one game object, and in response to a group selecting operation 402, a target game object is incorporated into group 1, wherein the group selecting operation 402 may be a touch sliding operation or a touch tapping operation. In FIG. 4, a touch point is represented by a circular shadow.

At S205, a first grouping action or a second grouping action is executed, wherein the first grouping action is used to replace the at least one existing game object in the target group with the at least one target game object, and the second grouping action is used to combine the at least one target game object into the target group.

Optionally, in response to the number of the at least one existing game object in the target group that is greater than zero, it indicates that the current target group includes at least one game object. At this time, a first grouping action of replacing the at least one existing game object in the target group with the at least one target game object is executed, or a second grouping action of combining the at least one target game object into the target group is executed. The first grouping action and the second grouping action will be described in detail below in conjunction with specific embodiments.

In the present embodiment, the group selecting operation is a touch operation, a position of a touch point of the group selecting operation is detected, and in response to the position of the touch point that meets a preset condition, a preset group action control is displayed.

The preset group action control is used for indicating the group of the at least one target game object to complete preset group action. For example, it may be the first grouping action or the second grouping action. In the present embodiment, specific group action corresponding to the preset group action control is not limited, which may be selected according to actual needs.

Specifically, in response to the position of the touch point that is located within a control area of the grouping sub-control, or the position of the touch point is located at the center of the grouping sub-control, it can be determined that the position of the touch point meets a preset condition, wherein the preset condition may also have other setting method. For example, time that the position of the touch point stays on the grouping sub-control exceeds a preset duration, etc. In the present embodiment, the preset condition is not limited herein.

Furthermore, in response to that it is determined that the position of the touch point meets the preset condition, preset grouping control is displayed within a preset distance range of the target grouping sub-control, wherein the preset distance range may be determined according to actual needs, and there is no limitation herein. By displaying the preset group action control, the functions of the grouping control can be further expanded, thereby the utilization of the grouping control is improved.

The following is an explanation with reference to FIG. 5. As shown in FIG. 5, in response to a position of a touch point of a group selecting operation 501 (indicated by a circular shadow) that is located in a control area of the grouping sub-control corresponding to group 1, a preset group action control 503 is displayed. A group action corresponding to the preset group action control 503 in FIG. 3 is a replacement action of replacing at least one existing game object in group 1 with at least one target game object. At this time, "Replace" is displayed on the preset group action control 503. In an optional embodiment, the preset group action control 503 may also be used for implementing a combination operation of combining the at least one target game object into the group 1. At this time, "Combine" is displayed on the preset group action control 503.

In an optional implementation manner, the group selecting operation may be a touch sliding operation, for example, after the grouping control is provided, the touch sliding operation starts from a center position of the grouping control as a touch start point, or any position of the graphical user interface may be used as a touch start point, which is not limited in the present embodiment.

Furthermore, a position of an end touch point of the group selecting operation is determined. In response to the end touch point of the group selecting operation that is located in a target grouping sub-control, one of the first grouping action and the second grouping action is executed. In response to the end touch point of the group selecting operation that is located in the preset group action control, the other of the first grouping action and the second grouping action is executed. In the present embodiment, specific triggering manner of the first grouping action and the second grouping action is not limited herein, as long as the two triggering manners can be distinguished.

In the following, for example, the group action corresponding to the preset group action control is the second grouping action (Replace). Firstly, as shown in FIG. 5, in response to the end touch point of the group selecting operation 501 that is located in the target grouping sub-control 502, for example, the second grouping action of combining the at least one target game object into the target group may be executed. Specifically, the group selecting operation 501 ends. At this time, group 1 includes at least one existing game object and at least one target game object.

Secondly, as shown in FIG. 6, in response to the end touch point of the group selecting operation 601 that is located in the preset group action control 602, for example, the first grouping action of replacing the at least one existing game object in the target group with the at least one target game object may be executed. "Replace" is displayed on the preset group action control 602 at this time. Specifically, the group selecting operation 501 ends. At this time, group 1 only includes the at least one target game object.

The above description is based on the example that the group action corresponding to the preset group action control is the second grouping action, wherein the group action corresponding to the preset grouping control may also be the first grouping action (Combine), and its implementation method is the same as that described above and will not be repeated herein. Those skilled in the art can understand that it is only necessary to ensure that the preset group action control corresponds to any one of the first grouping action or the second grouping action, and the target grouping sub-control corresponds to another group action. The specific correspondence may be set according to actual needs.

In another optional implementation method, the group action that to be executed may also be determined by a group determining operation. Specifically, in response to the group determining operation, an acting position of the group determining operation is detected. The group determining operation is a touch tapping operation. For example, after the grouping control is provided, a group determining operation is performed on the target grouping sub-control in the grouping control, or after the preset group action control is provided, the group determining operation is performed on the preset group action control.

In response to the acting position that is located in the target grouping sub-control, one of the first grouping action and the second grouping action is executed; and in response to the acting position that is located in the preset group action control, the other of the first grouping action and the second grouping action is executed.

In the following, for example, the group action corresponding to the preset group action control is the second grouping action (Replace) with reference to FIG. 5. Firstly, as shown in FIG. 5, in response to the acting position of the group determining operation 501 that is located in the target grouping sub-control 502, for example, the second grouping action of combining the at least one target game object into the target group may be executed. At this time, group 1 includes at least one existing game object and at least one target game object.

Secondly, as shown in FIG. 6, in response to the acting position of the group determining operation 601 that is located in the preset group action control 602, for example, the first grouping action of replacing the at least one existing game object in the target group with the at least one target game object may be executed. At this time, group 1 only includes the at least one target game object.

The group action corresponding to the preset grouping control may also be the first grouping action (Combine), and its implementation method is the same as that described above and will not be repeated herein.

At S206, an object identifier of the target game object is displayed in the target grouping sub-control.

The object identifier of the target game object may be, for example, a graphic or file indication information of the game object (for example, avatar/icon indication information, name indication information), and may also include a number of the at least one target game object, blood volume, etc.

Optionally, the object identifier of the at least one target game object may also include such as text, numbers, letters, or pictures. In the present embodiment, the implementation manner of the object identifier of the target game object displayed in the grouping sub-control is not specifically limited herein.

In response to the group action executed that is the first grouping action, the object identifier of the at least one target game object is displayed on the target grouping sub-control, and the object identifier of original game object in the target grouping sub-control is deleted. in response to the group action executed that is the second grouping action, the object identifier of the at least one target game object is added on the basis of the object identifier of the original game object displayed in the target grouping sub-control.

By displaying an object identifier, a user can quickly determine object information of the at least one game object finally included in a group corresponding to a current grouping sub-control, thereby the game experience of the user is improved.

At S207, a group identification is performed on the at least one target game object on the graphical user interface, wherein the group identification is used for indicating a group to which the target game object belongs.

In the present embodiment, the group identifier may be, for example, a group number displayed above the at least one target game object, wherein the group number indicates a group to which the at least one target game object belongs, such as group 1 or group 2, or the at least one target game object may be grouped and identified according to a preset color, wherein different color identifiers correspond to different groups. By using the group identifier on the at least one game object to indicate the group, the group of the at least one game object can be quickly determined to improve the operating efficiency of the game.

In an optional embodiment, the group identifier of the at least one target game object may be set to be gone after a preset time has elapsed starting from a time node in response to the group identifier that appears, or the group identifier may also be set to be concealed. In response to that performing preset operations on the at least one target game object (such as a touch tapping operation or a touch sliding operation), the group identifier is displayed again. By setting the preset time, the group identifier disappears or hides, which can avoid the problem with confusion of a game interface caused by the long-term existence of the group identifier, and interference with the game operation.

The game object control method provided in the embodiment of the present disclosure includes: in response to object selecting operation, at least one target game object is determined in at least one game object. In response to object grouping trigger operation, a grouping control is provided, wherein the grouping control includes at least one grouping sub-control. In response to a group selecting operation, a target grouping sub-control is determined in the grouping sub-control in the at least one grouping sub-control, and it is determined whether a number of at least one existing game object in the target group is equal to zero, and in response to the number of the at least one existing game object in the target group that is equal to zero, the target game object is incorporated into the target group. In response to the number of the at least one existing game object in the target group that is not equal to zero, a first grouping action or a second grouping action is executed, wherein the first grouping action is used to replace the existing game object in the target group with the target game object, and the second grouping action is used to combine the target game object into the target group. An object identifier of the target game object is displayed on the target grouping sub-control. A group identification is performed on the target game object on the graphical user interface, wherein the group identification is used for indicating a group to which the target game object belongs. By means of an operation of incorporating the at least one target game object into the target group in response to the target group that does not contain the at least one game object, the at least one target game object can be grouped quickly and effectively to improve the operation efficiency of the game. In response to the target group that contains the at least one game object, a replacement operation or a combination operation is performed according to different operation positions of the group selecting operation, thereby the group operation that can be performed by the grouping control is expanded to improve the utilization of the grouping control.

The present disclosure also provides a game object control apparatus, applied to a mobile touch terminal rendered a graphical user interface. The graphical user interface includes at least one game object. The apparatus includes at least one processor, and at least one memory for storing a program element. The program element is executed by the processor, and the program element includes a selection component, a trigger component and a group component.

Figure 7:
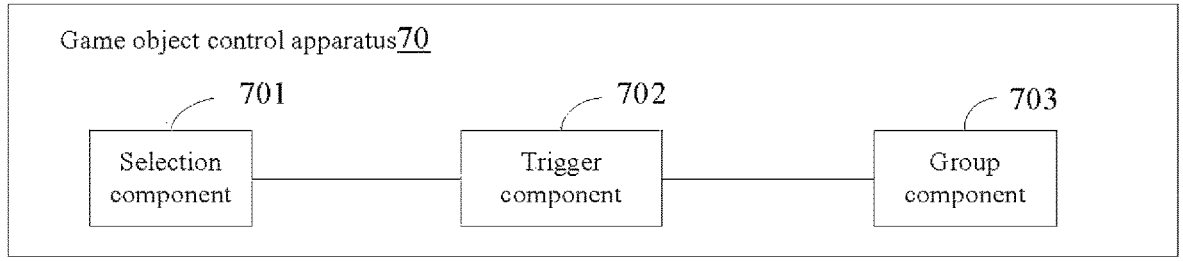
FIG. 7 is a schematic structure diagram 1 of a game object control apparatus according to one of the embodiments of the present disclosure.

FIG. 7 is a schematic structure diagram 1 of a game object control apparatus according to one of the embodiments of the present disclosure. As shown in FIG. 7, the apparatus 70 includes a selection component 701, a trigger component 702, and a group component 703.

The selection component 701 is configured to determine at least one target game object in the at least one game objects, in response to object selecting operation.

The trigger component 702 is configured to provide a grouping control, in response to object grouping trigger operation, wherein the grouping control includes at least one grouping sub-control.

The group component 703 is configured to determine a target grouping sub-control in the at least one grouping sub-control, in response to a group selecting operation, and determine the at least one target game object as a target group corresponding to the target grouping sub-control.

It should be noted that the selection component 701, the trigger component 702 and the group component 703 may be run in a terminal as a part of the apparatus. The functions implemented by the above elements may be executed by a processor in a computer terminal. The terminal may also be a smart phone (such as an Android phone or an iOS phone), a tablet computer, a palmtop, a Mobile Internet Device (MID), a PAD, or other terminal devices.

Optionally, the group component 703 is specifically configured to:
   combine the at least one target game object into the target group.

Optionally, the group component 703 is specifically configured to:
   replace at least one existing game object in the target group with the at least one target game object.

Optionally, the group component 703 is specifically configured to:
   determine a number of at least one existing game object in the target group;

in response to the number that is equal to zero, append the at least one target game object into the target group; and in response to the number that is greater than zero, execute a first grouping action or a second grouping action, wherein the first grouping action is used to replace the at least one existing game object in the target group with the at least one target game object, and the second grouping action is used to combine the at least one target game object into the target group.

Optionally, the group component 703 is specifically configured to:

in response to an end touch point of the group selecting operation that is located in the target grouping sub-control, execute one of the first grouping action and the second grouping action; and in response to the end touch point of the group selecting operation that is located in a preset group action control, execute the other of the first grouping action and the second grouping action.

Optionally, the group selecting operation is a touch sliding operation.

Optionally, the group component 703 is specifically configured to:

detect, an acting position of a group determining operation, in response to the group determining operation;

in response to the acting position that is located in the target grouping sub-control, execute one of the first grouping action and the second grouping action; and in response to the acting position that is located in a preset group action control, execute the other of the first grouping action and the second grouping action.

Optionally, the group determining operation is a touch tapping operation.

The apparatus provided in the present embodiment may be used to execute the technical solutions of the foregoing method embodiments, and the implementation principles and technical effects are similar. The present embodiment will not be described herein.

Figure 8:
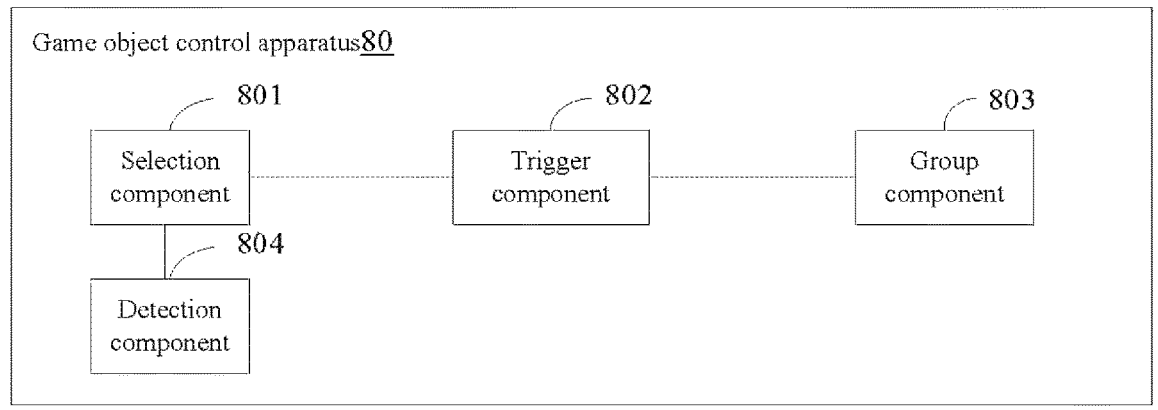
FIG. 8 is a schematic structure diagram 2 of a game object control apparatus according to one of the embodiments of the present disclosure.

FIG. 8 is a schematic structure diagram 2 of a game object control apparatus according to one of the embodiments of the present disclosure. As shown in FIG. 8, on the basis of the embodiment of FIG. 7, the present embodiment further includes: a detection component 804.

Optionally, the detection component 804 is specifically configured to:

detect a position of a touch point of the group selecting operation, and in response to the position that meets a preset condition, display the preset group action control.

It should be noted that the detection component 804 may be run in a terminal as part of the device, and the functions implemented by the above element may be executed by a processor in the terminal.

Optionally, the preset group action control is located within a preset distance range of the target grouping sub-control.

Optionally, the grouping control is a virtual wheel control, and the grouping sub-control is a fan-shaped sub-control of the virtual wheel control.

Optionally, the object selecting operation is a touch sliding operation, and the selection component 801 is specifically configured to:

determine the at least one target game object in the at least one game object according to a sliding trajectory of the object selecting operation, in response the object selecting operation.

It should be noted that the selection component 801 may be run in a terminal as part of the device, and the functions implemented by the above element may be executed by a processor in the terminal.

Optionally, the selection component 801 is specifically configured to:

determine the at least one game object within a first preset range of the sliding trajectory as the at least one target game object.

Optionally, the selection component 801 is specifically configured to:

determine a closed area according to the sliding trajectory, and determine the at least one game object within the closed area as the at least one target game object.

Optionally, the object grouping trigger operation is an area closing operation of the sliding trajectory.

Optionally, the object selecting operation is a touch tapping operation, and the selection component 801 is specifically configured to:

determine the at least one target game object in the at least one game object according to a click position of the object selecting operation, in response to the object selecting operation.

Optionally, the selection component 801 is specifically configured to:

determine the game object within a second preset range of the click position as the target game object.

Optionally, the object selecting operation includes multiple touch tapping operations, and the object grouping trigger operation is a touch tapping operation that meets a preset condition among the multiple touch tapping operations.

Optionally, the touch tapping operation that meets the preset condition includes: a touch tapping operation during which a touch click duration is greater than a preset duration, or a touch tapping operation under which a touch click pressure is greater than a preset pressure.

Optionally, the at least one grouping sub-control includes group identification information, and the group component 803 is further configured to:

display an object identifier of the at least one target game object in the target grouping sub-control, after the group of the target game object as a target group corresponding to the target grouping sub-control is determined; and perform a group identification on the at least one target game object on the graphical user interface according to the object identifier, wherein the group identification is used for indicating a group to which the at least one target game object belongs.

The apparatus provided in the present embodiment may be used for executing the technical solutions of the foregoing method embodiments, and the implementation principles and technical effects are similar. The present embodiment will not be described here.

Figure 9:
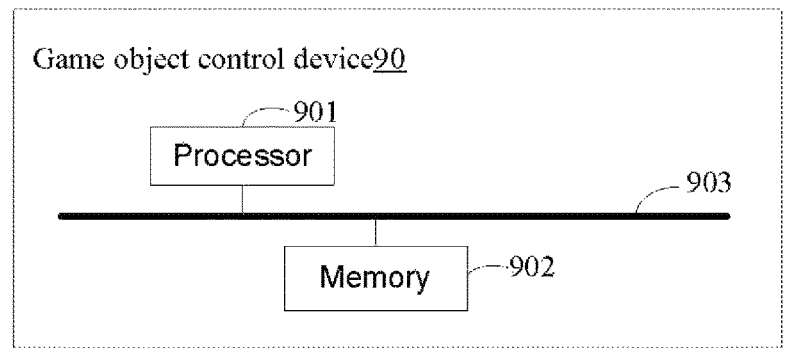
FIG. 9 is a schematic hardware structure diagram of a game object control device according to one of the embodiments of the present disclosure.

FIG. 9 is a schematic hardware structure diagram of a game object control device according to one of the embodiments of the present disclosure. As shown in FIG. 9, a game object control device 90 of the present embodiment includes: a processor 901 and a memory 902.

The memory 902 is configured to store at least one executable instruction.

The processor 901 is connected with the memory, and configured to execute the at least one executable instruction stored in the memory 902, wherein the at least one executable instruction comprises:

a memory, configured to store at least one executable instruction; and a processor, connected with the memory, and configured to execute the at least one executable instruction stored in the memory, wherein the at least one executable instruction included:

in response to object selecting operation, at least one target game object is determined in the at least one game objects;

in response to object grouping trigger operation, a grouping control is provided, wherein the grouping control included at least one grouping sub-control; and in response to a group selecting operation, a target grouping sub-control is determined in the at least one grouping sub-control, and the at least one target game object is determined as a target group corresponding to the target grouping sub-control.

The processor 901 and may execute various functional applications and data processing by running software programs and modules stored in the memory 902 to implement various steps performed by the game object control method in the above embodiments. For details, reference may be made to the related description in the foregoing method embodiments.

Optionally, the memory 902 may be independent or integrated with the processor 901.

In response to the memory 902 that is independently arranged, the game object control device further includes a bus 903 configured to connect the memory 902 and the processor 901.

The game object control device 90 may also include: a power supply component, configured to perform power management on the electronic device; a wired or wireless network interface, configured to connect the electronic device to a network; and an input output (I/O) interface. The game object control device 90 may operate based on an operating system stored in a memory, such as Android, iOS, Windows, Mac OS X, Unix, Linux, or FreeBSD.

It can be understood by those of ordinary skill in the art that the structure shown in FIG. 9 is merely illustrative. The game object control device 90 may be an electronic device such as a smart phone, a tablet computer, a palmtop computer, an MID, or a PAD. FIG. 9 does not limit the structure of the above game object control device 90. For example, the game object control device may also include more or fewer components (such as a network interface or a display device) than shown in FIG. 9, or has a different configuration from that shown in FIG. 9.

An embodiment of the present disclosure also provides a non-transitory storage medium that stores a computer-executable instruction. In response to a processor that executes the computer-executable instruction, the game object control method performed by the game object control device is implemented.

Figure 10:
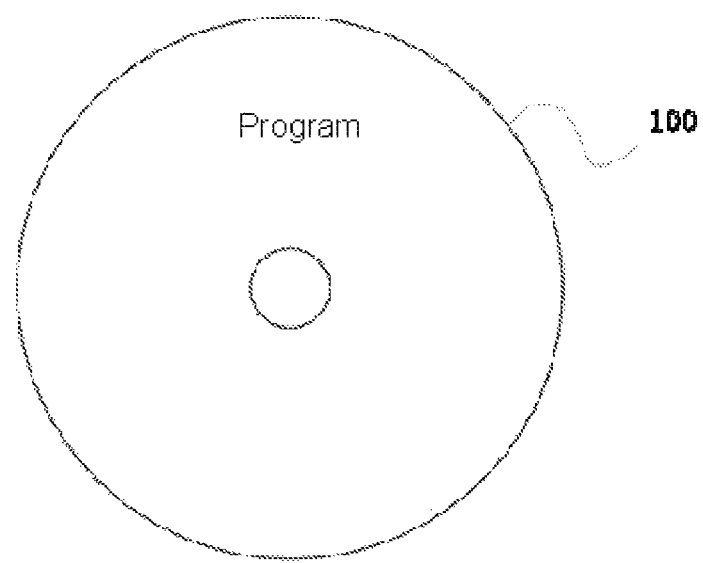
FIG. 10 is a schematic structure diagram of a computer-readable storage medium according to one of the embodiments of the present disclosure.

FIG. 10 is a schematic structure diagram of a computer-readable storage medium according to one of the embodiments of the present disclosure. As shown in FIG. 10, a program product 100 according to an implementation manner of the present disclosure is described. The non-transitory storage medium stores a computer program, on which at least one computer program is stored, the at least one computer program being executed by a processor to implement the following steps:

in response to object selecting operation, at least one target game object is determined in at least one game object;

in response to object grouping trigger operation, a grouping control is provided, wherein the grouping control included at least one grouping sub-control; and in response to a group selecting operation, a target grouping sub-control is determined in the at least one grouping sub-control, and the at least one target game object is determined as a target group corresponding to the target grouping sub-control.

Optionally, in the present embodiment, the non-transitory storage medium may also be configured as a program code for determining various preferred or optional method steps of a game object control method.

The various functional components provided by the embodiments of the present disclosure may be run in a game object control apparatus or a similar operational apparatus, or may be stored as part of the non-transitory storage medium.

Those of ordinary skill in the art can understand that all or part of the steps in various methods of the above embodiments may be completed by a program to instruct the related hardware of the game object control apparatus. The program may be stored in a non-transitory storage medium of the game object control apparatus. The non-transitory storage medium may include a flash disk, a Read-Only Memory (ROM), a Random Access Memory (RAM), a magnetic disk or an optical disk, and the like.

In some embodiments provided by the present disclosure, it should be understood that the disclosed device and method may be implemented in another manner. For example, the device embodiment described above is only schematic, and for example, division of the components is only logic function division, and other division manners may be adopted during practical implementation. For example, multiple components may be combined or integrated into another system, or some characteristics may be neglected or not executed. In addition, coupling or direct coupling or communication connection between each displayed or discussed component may be indirect coupling or communication connection, implemented through some interfaces, of the device or the components, and may be electrical and mechanical or adopt other forms.

The integrated component implemented in the form of a software functional component may be stored in the non-transitory storage medium. The software functional component is stored in the non-transitory storage medium, including a plurality of instructions enabling a computer device (which may be a personal computer, a server, a network device or the like) or a processor to execute part of the steps of the method in each embodiment of the application.

It should be understood that the processor may be a Central Processing Element (CPU), or may be other general purpose processors, a Digital Signal Processor (DSP), an Application Specific Integrated Circuit (ASIC), or the like. The general purpose processor may be a microprocessor, or the processor may also be any conventional processor, etc. The steps of the method disclosed in combination with the present disclosure may be directly embodied as a hardware processor for execution and completion, or a combination of hardware and software components in the processor for execution and completion.

The memory may include a high-speed RAM, may also include a Non-Volatile Memory (NVM) such as at least one magnetic disk memory, and may also be a U disk, a mobile hard disk, a ROM, a magnetic disk, or an optical disk.

The bus may be an Industry Standard Architecture (ISA) bus, a Peripheral Component (PCI) bus, or an Extended Industry Standard Architecture (EISA) bus. The bus may be divided into an address bus, a data bus, a control bus, and the like. For ease of representation, the bus in the drawings of the application does not limit to only one bus or one type of bus.

The above non-transitory storage medium may be implemented by any type of volatile or non-volatile storage device or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a ROM, a magnetic memory, a flash memory, a magnetic disk or an optical disk. The non-transitory storage medium may be any available medium that can be accessed by a general purpose or special purpose computer.

Those of ordinary skill in the art may understand that all or part of the steps of the foregoing method embodiments may be completed by a program instructing relevant hardware. The foregoing program may be stored in a non-transitory storage medium. In response to the program that is executed, the steps including the foregoing method embodiments are performed. The foregoing non-transitory storage medium includes various media capable of store program codes, such as a ROM, a RAM, a magnetic disk, or an optical disk.

The above embodiments are only used to illustrate the technical solutions of the present disclosure, and are not limited thereto. Although the present disclosure has been described in detail with reference to the foregoing embodiments, those skilled in the art should understand that the technical solutions described in the foregoing embodiments are modified, or some or all technical features are equivalently replaced, but the modifications and replacements do not make the essence of the corresponding technical solutions depart from the scope of the technical solutions of various embodiments of the present disclosure.

It should be noted that the specification and claims of the present disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or components to clearly list those steps or components, and other steps or components which are not clearly listed or are inherent to these processes, methods, products or devices may be included instead.

It should be finally noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

INDUSTRIAL APPLICABILITY

In response to object selecting operation, at least one target game object is determined in game objects. In response to object grouping trigger operation, a grouping control is provided, wherein the grouping control includes at least one grouping sub-control. In response to a group selecting operation, a target grouping sub-control is determined in the grouping sub-control, and a group of the target game object is determined as a target group corresponding to the target grouping sub-control. A grouping control including at least one grouping sub-control is provided by object grouping trigger operation, and in response to a group selecting operation, a target grouping sub-control is determined, and a group of a target game object is determined as a target group corresponding to the target grouping sub-control, thereby quick selection and grouping of game objects to improve the operation control efficiency of the at least one game object is realized.

What is claimed is:

1. A game object control method, applied to a mobile touch terminal rendered with a graphical user interface, wherein the graphical user interface comprises at least one game object, the method comprising:
   in response to an object selecting operation, determining at least one target game object in the at least one game object;
   in response to an object grouping trigger operation, providing a grouping control, wherein the grouping control is displayed on the graphical user interface and comprises at least one grouping sub-control; and
   in response to a group selecting operation acting on the grouping control, determining a target grouping sub-control in the at least one grouping sub-control, and determining a group of the at least one target game object as a target group corresponding to the target grouping sub-control; wherein
   the determining the group of the at least one target game object as the target group corresponding to the target grouping sub-control comprises:
   determining a number of at least one existing game object in the target group;
   in response to the number that is equal to zero, appending the at least one target game object to the target group; and
   in response to the number that is greater than zero, executing a first grouping action or a second grouping action, wherein the first grouping action is used to replace the at least one existing game object in the target group with the at least one target game object, and the second grouping action is used to combine the at least one target game object into the target group.

2. The method as claimed in claim 1, wherein determining the group of the at least one target game object as the target group corresponding to the target grouping sub-control comprises:
   combining the at least one target game object into the target group.

3. The method as claimed in claim 1, wherein determining the group of the at least one target game object as the target group corresponding to the target grouping sub-control comprises:
   replacing at least one existing game object in the target group with the at least one target game object.

4. The method as claimed in claim 1, wherein executing a first grouping action or a second grouping action comprises:
   in response to an end touch point of the group selecting operation that is located in the target grouping sub-control, executing one of the first grouping action and the second grouping action; and
   in response to an end touch point of the group selecting operation that is located in a preset group action control, executing the other of the first grouping action and the second grouping action.

5. The method as claimed in claim 4, wherein the group selecting operation is a touch sliding operation.

6. The method as claimed in claim 1, wherein executing a first grouping action or a second grouping action comprises:
   in response to a group determining operation, detecting an acting position of the group determining operation;
   in response to the acting position that is located in the target grouping sub-control, executing one of the first grouping action and the second grouping action; and
   in response to the acting position that is located in a preset group action control, executing the other of the first grouping action and the second grouping action.

7. The method as claimed in claim 6, wherein the group determining operation is a touch tapping operation.

8. The method as claimed in claim 4, further comprising:
   detecting a position of a touch point of the group selecting operation, and in response to the position that meets a preset condition, displaying the preset group action control.

9. The method as claimed in claim 4, wherein the preset group action control is located within a preset distance range of the target grouping sub-control.

10. The method as claimed in claim 1, wherein the grouping control is a virtual wheel control, and the grouping sub-control is a fan-shaped sub-control of the virtual wheel control.

11. The method as claimed in claim 1, wherein the object selecting operation is a touch sliding operation, and determining the at least one target game object in the at least one game object comprises:
    in response to the object selecting operation, determining the at least one target game object in the at least one game object according to a sliding trajectory of the object selecting operation.

12. The method as claimed in claim 11, wherein determining the at least one target game object in the at least one game object according to the sliding trajectory of the object selecting operation comprises:
    determining the at least one game object within a first preset range of the sliding trajectory as the at least one target game object.

13. The method as claimed in claim 11, wherein determining the at least one target game object in the at least one game object according to the sliding trajectory of the object selecting operation comprises:
    determining a closed area according to the sliding trajectory, and determining the at least one game object within the closed area as the at least one target game object.

14. The method according to claim 13, wherein the object grouping trigger operation is an area closing operation of the sliding trajectory.

15. The method as claimed in claim 1, wherein the object selecting operation is a touch tapping operation, and, in response to the object selecting operation, determining at least one target game object in the at least one game object comprises:
    in response to the object selecting operation, determining the at least one target game object in the at least one game object according to a click position of the object selecting operation.

16. The method as claimed in claim 15, wherein determining the at least one target game object in the at least one game object according to a click position of the object selecting operation comprises:
    determining the game object within a second preset range of the click position as the target game object.

17. The method as claimed in claim 1, wherein the object selecting operation comprises a plurality of touch tapping operations, and the object grouping trigger operation is a touch tapping operation that meets a preset condition among the plurality of touch tapping operations.

18. The method according to claim 17, wherein the touch tapping operation that meets the preset condition comprises: a touch tapping operation during which a touch click duration is greater than a preset duration, or a touch tapping operation under which a touch click pressure is greater than a preset pressure.

19. The method as claimed in claim 1, wherein the grouping sub-control comprises group identification information, and after determining a group of the at least one target game object as a target group corresponding to the target grouping sub-control, the method further comprises:
    displaying an object identifier of the target game object in the target grouping sub-control; and
    performing a group identification on the target game object in the graphical user interface, wherein the group identification is used to indicate a group to which the target game object belongs.

20. A game object control device, comprising:
    a memory, configured to store at least one executable instruction; and
    a processor, connected with the memory, and configured to execute the at least one executable instruction stored in the memory, wherein the at least one executable instruction comprises:
    in response to an object selecting operation, determining at least one target game object in at least one game object;
    in response to an object grouping trigger operation, providing a grouping control, wherein the grouping control is displayed on a graphical user interface of the game object control device and comprises at least one grouping sub-control; and
    in response to a group selecting operation acting on the grouping control, determining a target grouping sub-control in the at least one grouping sub-control, and determining a group of the at least one target game object as a target group corresponding to the target grouping sub-control; wherein
    the determining the group of the at least one target game object as the target group corresponding to the target grouping sub-control comprises:
    determining a number of at least one existing game object in the target group;
    in response to the number that is equal to zero, appending the at least one target game object to the target group; and
    in response to the number that is greater than zero, executing a first grouping action or a second grouping action, wherein the first grouping action is used to replace the at least one existing game object in the target group with the at least one target game object, and the second grouping action is used to combine the at least one target game object into the target group.

21. A non-transitory storage medium, storing a computer program, on which at least one computer program is stored, the at least one computer program being executed by a processor of a device to implement the following steps:

in response to an object selecting operation, determining at least one target game object in at least one game object;

in response to an object grouping trigger operation, providing a grouping control, wherein the grouping control is displayed on a graphical user interface of the device and comprises at least one grouping sub-control; and in response to a group selecting operation acting on the grouping control, determining a target grouping sub-control in the at least one grouping sub-control, and determining a group of the at least one target game object as a target group corresponding to the target grouping sub-control; wherein the determining the group of the at least one target game object as the target group corresponding to the target grouping sub-control comprises:

determining a number of at least one existing game object in the target group;

in response to the number that is equal to zero, appending the at least one target game object to the target group; and in response to the number that is greater than zero, executing a first grouping action or a second grouping action, wherein the first grouping action is used to replace the at least one existing game object in the target group with the at least one target game object, and the second grouping action is used to combine the at least one target game object into the target group.

* * * * *